United States Patent [19]

Tanaka et al.

[11] Patent Number: 5,048,786
[45] Date of Patent: Sep. 17, 1991

[54] POWER SEAT SLIDER DRIVING MECHANISM

[75] Inventors: Yuji Tanaka; Isao Kuwabara; Isamu Chinomi, all of Kanagawa, Japan

[73] Assignee: Ikeda Bussan Co., Ltd., Ayase, Japan

[21] Appl. No.: 451,320

[22] Filed: Dec. 15, 1989

[30] Foreign Application Priority Data

Dec. 26, 1988 [JP] Japan .................. 63-168059[U]

[51] Int. Cl.⁵ .............................................. B60N 1/02
[52] U.S. Cl. .................................................. 248/429
[58] Field of Search ...................... 248/405, 406.1, 419, 248/420, 422, 424, 429, 430; 74/409; 297/330, 344

[56] References Cited

U.S. PATENT DOCUMENTS

| 3,184,209 | 5/1965 | Colautti | 248/429 |
| 4,292,722 | 10/1981 | Worsham | 74/409 |
| 4,434,677 | 3/1984 | Linley, Jr. | 74/409 |
| 4,721,337 | 1/1988 | Tomita | 297/344 |
| 4,802,374 | 2/1989 | Hamelin | 248/429 |
| 4,907,776 | 3/1990 | Nemoto | 248/430 |

FOREIGN PATENT DOCUMENTS 1472393 2/1969 Fed. Rep. of Germany .
3508515 8/1986 Fed. Rep. of Germany .
3919378 12/1989 Fed. Rep. of Germany .

Primary Examiner—Alvin C. Chin-Shue
Assistant Examiner—Robert A. Olson
Attorney, Agent, or Firm—Foley & Lardner

[57] ABSTRACT

A power seat drive mechanism for an automobile has a motor which drives a worm which in turn drives a worm wheel at a given speed. The worm wheel is connected to a threaded shaft which it drives to rotate. Rotation of the threaded shaft forces it through a nut which is fixed to the body of the vehicle. This drives the threaded shaft which is connected to the sliding frame of the seat longitudinally with respect to the vehicle. In order to prevent force exerted on the seat in the direction of its travel, from causing the threaded shaft to rotate faster than it is being driven and thus overrun the worm gear, a resilient governor member is included which provides a limited braking effect and tends to resist the rotation of the shaft. With this configuration, backlash in the drive mechanism is eliminated.

11 Claims, 4 Drawing Sheets

POWER SEAT SLIDER DRIVING MECHANISM

BACKGROUND OF THE INVENTION

1. Field of the Invention

The present invention relates to a power seat driving mechanism comprising a gear mechanism for coupling a source of rotational energy to a threaded shaft which drives the seat to move with respect to a guide rail on which it is mounted. Still more specifically, the instant invention relates to an improved drive mechanism for a power seat wherein backlash in the drive train which drives the threaded member is eliminated.

2. Description of the Prior Art

In automotive vehicles it is common to use power seat mechanisms for driving a passenger seat to a position selected by the seat occupant and thus obviate the need for the occupant to manually exert force on the seat for said purpose. An example of such a power seat mechanism is illustrated in FIGS. 1 and 2.

Referring now to FIG. 1, the overall structure of the prior art power seat driver mechanism is shown in perspective. As will be noted this view includes the structural members of the seat to which the seat driver mechanism is directly coupled and the guide rail by which the seat is coupled to the floor of the vehicle (not shown).

The illustrated prior art seat slider device includes a pair of seat cushion rails 1 which are usually formed integrally with the bottom portion of the frame of the seat cushion (not shown) and the seat cushion frame forms the base structure of the seat. The seat cushion slider rails 1 are formed so as to have generally C-shaped cross sections.

The slider rails 1 are slidably supported on a pair of guide rails 2. In this arrangement the guide rails 2 are partially enclosed by the slider rails 1 and are rigidly mounted to the floor (not shown) of the vehicle so as to be aligned in the fore and aft direction of the vehicle and are parallel to each other. The seat cushion slider rails 1 are thus mounted on guide rails 2 so as to be slidable therealong.

At one end each of the respective seat cushion slider rails 1 are inwardly protruding brackets on which one end of a threaded shaft member 3 is rotatably supported. At the other ends of the seat cushion rails, inwardly protruding brackets are provided for supporting a pair of gear housings 6.

A source of rotational energy, such as an electric motor 5, is supported on one of the gear housings 6. The motor 5 is coupled to a drive shaft 7 so as to be operable to drive the drive shaft 7 to rotate. The drive shaft 7 extends between the gear housings 6 and the ends of the drive shaft 7 terminate within the gear housings 6.

One end of each of the respective threaded shaft members 3 terminates within the gear housings 6. Thus, both the threaded shafts 3 are rotatably supported at both ends so as to extend along the inner sides of the seat cushion rails 1 in a parallel relationship thereto. The shafts 3 are supported in such a manner that, while being rotatable, they cannot be moved longitudinally with respect to the seat cushion rails 1.

At its central portion, the threaded shaft 3 passes through a seat driver nut 4. The seat driver nut 4 is affixed to the floor mounted guide rail 2 or to the floor (not shown) of the vehicle by means of a bracket (not shown). Thus, the seat driver nut 4 is held rigid with respect to the guide rail 2 and cannot move longitudinally with respect thereto.

In FIG. 2, one of the gear housings is indicated in phantom lines so as to reveal the gear mechanism disposed therewithin. It will be understood that the gearing mechanisms in the respective gear housings at the terminal ends of the shaft 7 are essentially mirror images of each other. Accordingly, the one depicted in FIG. 2 is representative of both.

A worm 7a is disposed within the gear housing 6. The worm 7a is rigidly coupled to the drive shaft 7. The thread of the worm 7a meshes with the teeth of a worm wheel 8. The worm wheel is rigidly affixed to one end of the threaded shaft 3.

With the above construction, when it becomes desirable for the seat occupant to adjust the position of the seat with respect to the vehicle chassis in one of the forward or the rearward direction, the motor 5 is energized and drives the drive shaft 7 and the worm attached to the end thereof, to rotate. The rotation of the worm 7a serves to bring a driving surface of the worm 7a into contact with the teeth of the worm wheel 8.

This rotation of the worm wheel 8 is transmitted to the threaded shaft member 3.

The rotation of the threaded shaft member 3 induces it to thread its way through the seat driver nut 4.

Since the threaded member 3 cannot move longitudinally with respect to the seat cushion slider rails 1, the seat cushion slider rail 1 is driven by threaded member 3 to move longitudinally with respect to the guide rails 2.

In this manner, the position of the seat mounted on the slider rails 1 can be adjusted with respect to the vehicle chassis.

In the above arrangement however, there is a disadvantage of a possibility that a backlash will be generated in the worm gear mechanism. This backlash tends to occur when, the motor 5 is energized so as to alter the position of the seat, the seat occupant manually exerts an additional force on the seat in the direction in which it is being driven, in an attempt to force the seat to move more quickly than it is being driven by the driver mechanism.

Under such circumstances, the additional force exerted on the seat by the seat occupant is translated by the engagement between the threads of the threaded shaft member 3 and the seat driver nut 4 into a tangential force acting on the threaded member 3 in the direction of its rotation. This causes the threaded member 3 to rotate faster than it is being driven to rotate by means of the engagement between the worm wheel 8 and the worm 7a. When the rotation rate of the threaded shaft exceeds the rotational speed at the worm wheel is being driven by the worm, the teeth of the worm wheel tend to disengage slightly from the driving face of the thread of the worm 7a and may even come into contact with the trailing face of the thread of the worm 7a.

Under the above conditions, since the motor 5 is no longer operating under a load, it tends to accelerate and drive the worm 7a to rotate faster. Thus, the worm may accelerate so as to catch up with the worm wheel and the drive face of the threads thereof tends to strike against the driven face of the tooth of the worm wheel 8 which is currently in position to mesh with the worm. This produces a jolt in the rotation of the threaded shaft member 3 which is sufficiently strong as to be perceptible to the seat occupant and cause noise and vibration. This is distracting and annoying for the seat occupant.

What is more, such shocks between the engaging faces of the driving gear of the power seat driving mechanism tend to increase the wear on the gears and the support bearings of the drive shaft 7 and the threaded shaft 3. This in turn, tends to increase the amount of play in the worm gear mechanism, which again increases the rate of wear on the gears 7a and 8 and increases the amount of annoying vibrations that are produce in the seat of the vehicle by the drive mechanism.

SUMMARY OF THE INVENTION

In view of the above problems encountered in the power seat driving devices formed in accordance with the prior art it is an object of instant invention to provide a power seat driver mechanism wherein backlash in the gear mechanism by which the seat is driven can be eliminated.

It is another object of the instant invention to provide a seat driving mechanism wherein the wear on the gear mechanism by which the seat is driven can be minimized.

It is yet another object of the instant invention to provide a seat driver mechanism wherein vibrations produced in the gear mechanism while the seat is being driven thereby, are eliminated.

In brief, the above objects are achieved by an arrangement wherein in order to prevent force exerted on the seat in the direction of travel, from causing the threaded shaft to rotate faster than it is being driven and thus overrun the gears which transmit the rotational energy, a resilient governor member is provided on at least one of the rotating shafts.

More specifically, a first embodiment of the present invention is deemed to comprise a power seat slider mechanism which features: a guide rail rigidly mounted on a vehicle body; a sliding rail which slidably engages the guide rail so as to slide longitudinally thereon; a power means providing a power output for moving the sliding rail relative to the guide rail; a drive shaft coupled to the power means so as to be driven to rotate thereby; an output gear means provided on an end of the drive shaft; a threaded shaft member rotatably supported on either the guide rail or the sliding rail, the threaded shaft member being immovable in the direction of its axis relative to the member on which it is supported; a driver nut coupled to whichever one of the guide rail and the sliding rail on which the threaded shaft member is not mounted so as to be substantially immovable relative thereto, the threaded shaft member being arranged so as to have a thread thereof in engagement with a thread of the driver nut such that rotation of the threaded shaft forces the threaded shaft member to move in the direction of its axis with respect to the driver nut; an input gear provided on one end of the threaded member and being arranged so as to mesh with the output gear so as to be driven to rotate thereby, rotation of the input gear causing the threaded member to be rotated; and a governor member engaging a portion of the threaded shaft member for producing frictional resistance to the rotation of the threaded shaft member.

The governor means may be defined by a resilient member having a through bore engaging the threaded member so as to produce the frictional resistance.

The through bore may engage the threaded member at a threaded portion thereof so as to produce the frictional resistance.

The through bore may be formed so as to have a plurality of inwardly projecting protrusions projecting to its inner periphery.

Alternatively, the through bore may be formed so as to have a square cross section.

According to yet another aspect of the invention, the governor means may be defined by a resilient member having a through bore, and the resilient member may be disposed in a casing by which the driver nut means is supported.

The resilient governor means may define a resilient connection, between the driver nut means and the casing.

According to another aspect of the invention a vehicular power seat slide device comprises: a guide rail rigidly mounted to a vehicle body; a sliding rail slidably engaging the guide rail so as to slide longitudinally thereon; a motor providing a power output for moving the sliding rail relative to the guide rail; a drive shaft coupled to the motor so as to be driven to rotate thereby; a worm gear provided on an end of the shaft; a threaded shaft member rotatably supported on the sliding rail so as to be axially immovable relative thereto; a driver nut means coupled to the guide rail so as to be substantially immovable relative thereto, the threaded shaft member being arranged so as to have a thread thereof in engagement with a thread of the driver nut means such that rotation of the threaded shaft means forces the threaded shaft means to move axially with respect to the driver nut means; a worm wheel provided on one end of the threaded member, and being arranged so as to mesh with the worm so as to be driven to rotate thereby, rotation of the worm wheel causing the threaded member to rotate; and a resilient governor member comprising a through bore engaging a portion of the threaded shaft member for producing frictional resistance to the rotation of the threaded shaft member.

DETAILED DESCRIPTION OF THE PREFERRED EMBODIMENTS

Figure 4:
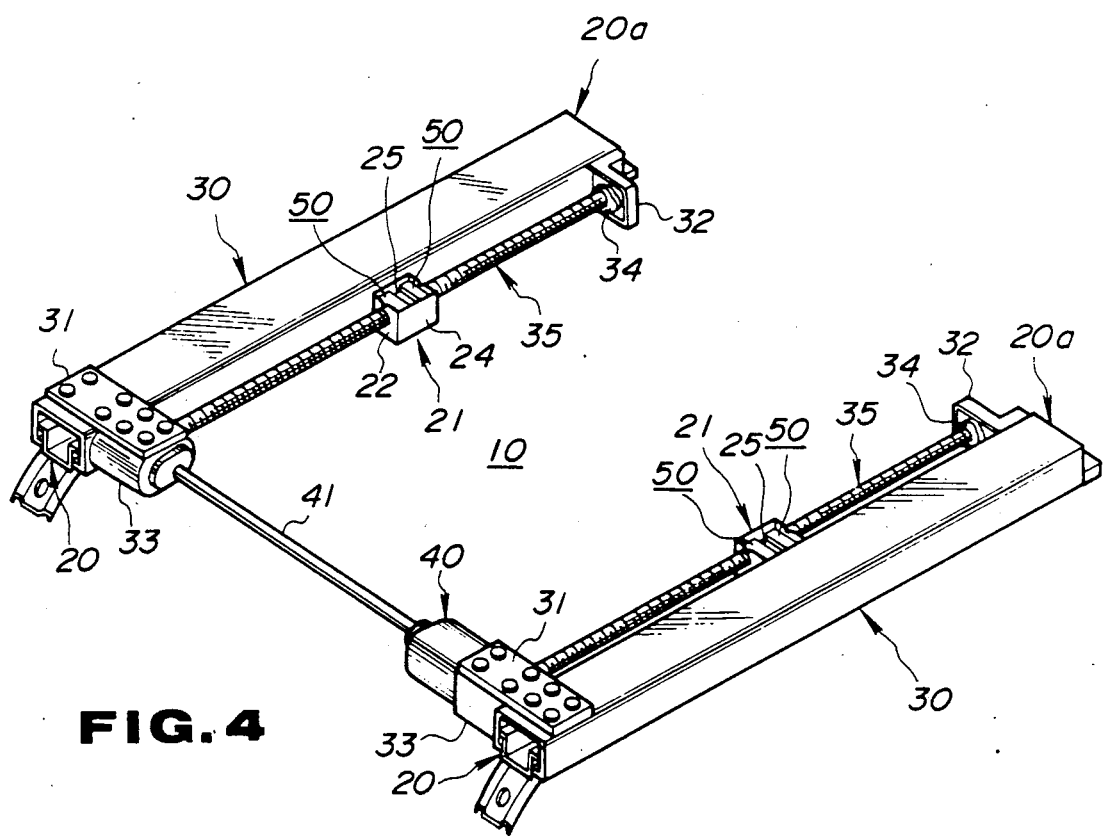
FIG. 4 is a perspective view in which the essential members including the slider members of a power seat slider mechanism formed in accordance with the first embodiment of the invention are depicted.

Attention is first drawn to FIG. 4 wherein the overall structure of the power seat driver mechanism is shown in perspective. This view includes the structural members of the seat to which the seat driver mechanism is directly coupled and the guide rail by which the seat is coupled to the floor of the vehicle (not shown).

As in the above described prior art power seat slider, a pair of seat cushion rails 30 which are formed so as to support the bottom portion of the frame of the seat cushion (not shown) are provided. The seat cushion slider rails 30 are formed so as to have generally C-shaped cross sections.

Enclosed within the respective seat cushion slider rails 30 are a pair of guide rails 20. The guide rails 20 are rigidly mounted to the floor (not shown) of the vehicle. The guide rails 20 are arranged on the floor of the vehicle so as to be aligned in the fore and aft direction of the vehicle and are parallel to each other. The seat cushion slider rails are thus mounted on the floor mounted guide rails so as to be slidable longitudinally with respect thereto.

At the rear ends 20a thereof each of the respective seat cushion slider rails include an inwardly protruding bracket 32. The brackets 32 have thrust bearings 34 formed on the forward facing sides thereof. The thrust bearings serve to rotatably support one end of a threaded shaft member 35 and serve to prevent the threaded shaft member from sliding, in its axial direction, relative to the seat cushion slider rails 30.

At the front ends of the respective seat cushion rails a pair of inwardly protruding brackets 31 are provided for supporting a pair of gear housings 33.

A motor 40 is supported on one of the gear housings 33. The motor 40 is coupled to a drive shaft 41 so as to be operable to drive the drive shaft 41 to rotate.

The drive shaft 41 extends between the gear housings 33, and one end of the drive shaft 41 terminates within each of the respective gear housings 33.

The front end of each of the respective threaded shaft members 35 terminates also within the gear housings 33. Thus, the threaded shafts 35 are rotatably supported at both ends so as to extend at the inner sides of the seat cushion rails 30 parallel thereto, and threaded members 35 are supported in such a manner that while being rotatable they cannot be moved longitudinally with respect to the seat cushion rails 30.

At its central portion, the threaded shaft 35 passes through a seat driver nut assembly 21. The seat driver nut assembly 21 is affixed to the floor mounted guide rail 20 by means of a bracket (not shown). Accordingly, the seat driver nut assembly 21 is held essentially rigidly onto the guide rail 20 and cannot move longitudinally with respect thereto.

It will be noted that the seat driver nut assembly may be alternatively affixed directly to the floor (not shown) of the vehicle to produce essentially the same effect.

Figure 1:
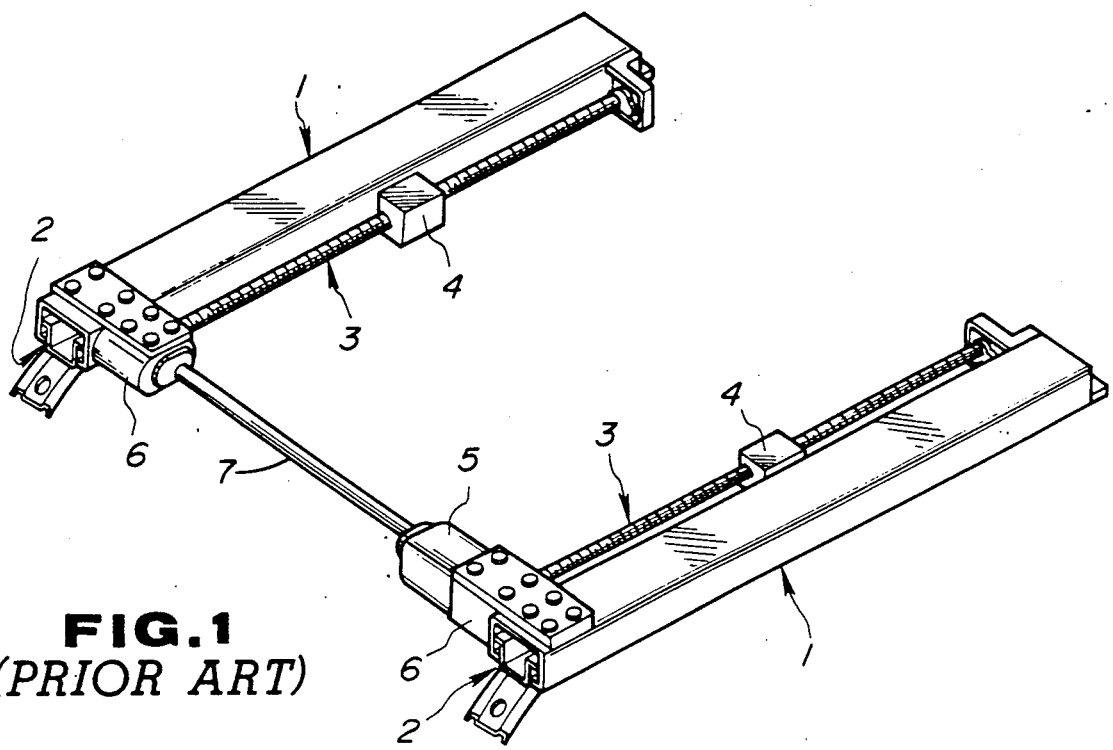
FIG. 1 is a perspective view in which the essential members including the slider members of a power seat slider mechanism formed according to the prior art, are depicted.
Figure 2:
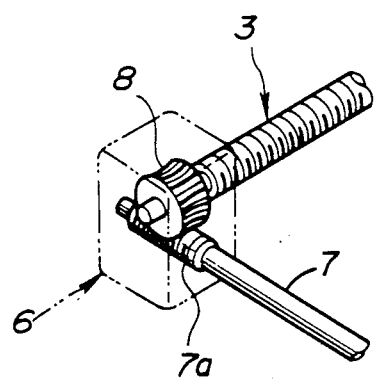
FIG. 2 is an enlarged partial perspective view of the drive gear elements of the prior art device wherein the gear casing is indicated in phantom chain lines.
Figure 3:
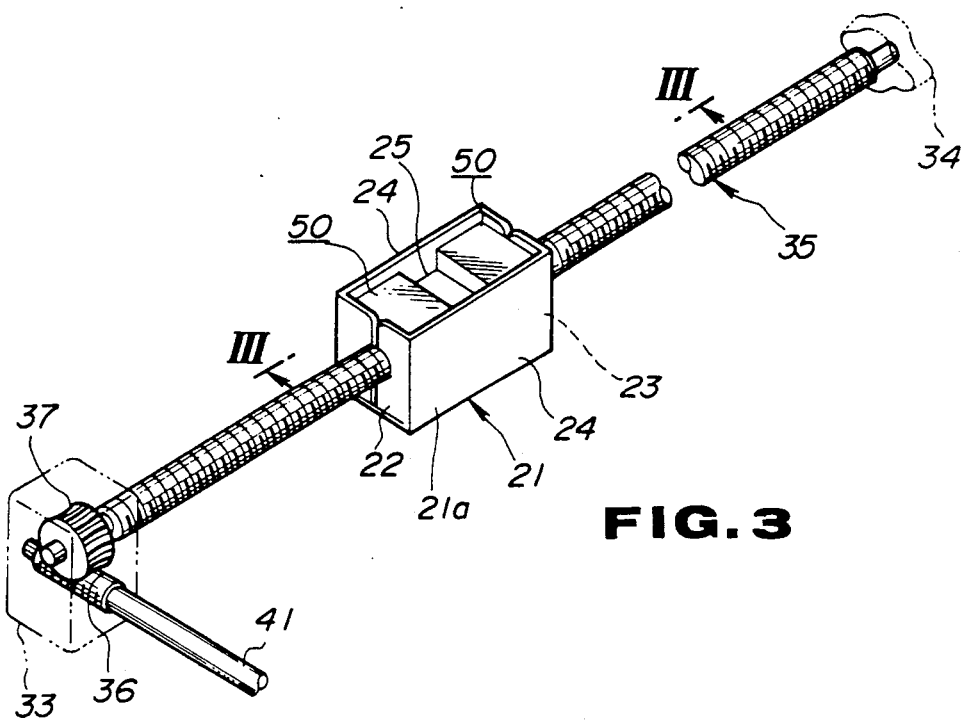
FIG. 3 is an enlarged partial perspective view of the essential drive train elements, except for the motor, of the seat slider mechanism according to the first embodiment of the instant invention.

FIG. 3 is an enlarged view of the gear and driving mechanisms of one side of the power seat drive unit. It will be understood that the gearing mechanisms on both sides of the unit are essentially mirror images of each other thus the elements depicted in FIG. 3 are representative of both sides of the unit.

Within the gear box casing 33 (indicated in phantom chain lines), a worm 36 is disposed. The worm 36 is rigidly coupled to the drive shaft 41. The thread of the worm 36 meshes with the teeth of a worm wheel 37. The worm wheel is rigidly affixed to one end of the threaded shaft 35.

The seat driver nut assembly 21 formed in accordance with the instant invention is essentially comprised of a rectangular box-shaped casing 21a. This box-shaped casing 21a defines a pair of side walls 24, a front wall 22, and a rear wall 23. The front wall 22 and the rear wall 23 have formed therein a pair of registered holes which are aligned with the axis of the threaded shaft member 35 so as to allow the threaded shaft member 35 to pass therethrough.

The side walls 24 of the nut casing 21a define a gap therebetween of a predetermined width. Disposed within the space defined by the front and rear walls 22 and 23 and the side walls 24 of the nut driver casing 21a are a driver nut 25 and a pair of resilient governor members 50.

The inner bore of the driver nut 25 is formed with a set of screw threads 25a which mesh with the threads of the threaded shaft member 35. The distance between the faces of the outer side of the driver nut 25 is essentially the same as the predetermined distance between the inner faces of the side walls 24. Therefore, while the nut 25 is disposed within the casing 21a and the inner bore thereof is aligned with the registered holes formed in the front and rear casing walls 23 and 22, the driver nut is restricted by the walls 24 so as to be non-rotatable with respect to the casing 21a.

Figure 5:
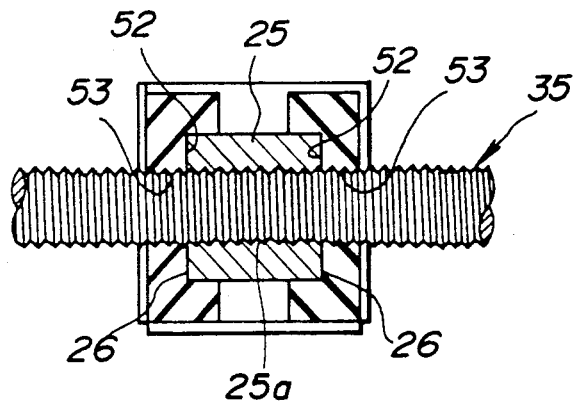
FIG. 5 is an enlarged cross-sectional side elevation view of a driver nut assembly according to the first embodiment of the instant invention as taken along section line III—III of FIG. 3.
Figure 6:
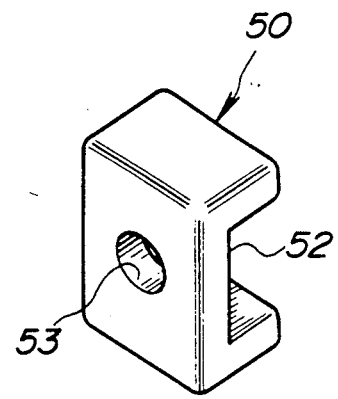
FIG. 6 is an enlarged perspective view of the resilient governor member of the first embodiment of the instant invention.

The governor members 50 according to the first embodiment of the instant invention are formed of a resilient material and form a shallow U-shape as will be best appreciated from a consideration of FIGS. 5 and 6. The central concave portion of the resilient governor members 50 define nut receiving faces 52 which engage the front and rear faces of the nut 25. The governor members also comprise a through bore 53. The diameter of the through bore 53 is slightly less than the outer diameter of the threaded shaft member 35.

The through bores 53 are aligned within the casing 21a such that they are aligned with the axis of the registered holes in the front and rear faces 22 and 23 of the casing 21a. The threaded shaft member 35 passes through the front and rear walls 22 and 23 of the casing 21a, through the through bores 53 of the governor members 50 and through the driver nut 25 so as to be threaded onto the driver nut 25.

Since the interior diameter of the through bore 53 of the elastic governor members 50 is slightly smaller than the outer diameter of the threaded shaft member 35, rotation of the threaded member 35 within the threaded bore causes a predetermined amount of friction to develop between the threaded shaft 35 and the driver nut assembly.

The dimensions along the axis of the threaded member 35, of the driver nut 25, and the governor members 50 are such that in order to fit them all into the interior space defined in the casing 21a between the front and rear walls 22 and 23, the elastic governor members 50 must be slightly compressed.

Similar to the prior art device, with the above construction, when it becomes desirable for the seat occupant to adjust the position of the seat with respect to the body of the vehicle in the forward or the rearward direction, the motor 40 is energized to rotate. The rotation of the motor 40 drives the drive shaft 41 to rotate. As the shaft 41 is rotated the worm 36 affixed to the end thereof is driven to rotate. The rotation of the worm 36 serves to bring a driving surface of the worm 36 into slipping contact with slip faces of the teeth of the worm wheel 37.

Accordingly, the worm engages successive teeth of the worm wheel 37 so as to drive the worm wheel 37 to rotate. This rotation of the worm wheel 37 is transmitted to the threaded shaft member 35 so as to rotate the threaded shaft member 35.

The rotation of the threaded shaft member 35 forces it to be driven through the seat driver nut 21 by means of the engagement between the threads formed on the driver nut 25 and the threads of the threaded member 35.

Since the threaded member 35 cannot move longitudinally with respect to the seat cushion slider rails 30, and the driver nut assembly cannot move with respect to the guide rails 20, the seat cushion slider rail 30 is driven by threaded member 35 to move longitudinally with respect to the guide rails 20 at a given rate determined by the rotational speed of the motor 40.

In this manner the position of the seat mounted on the slider rails 30 can be adjusted with respect to the body of the vehicle.

As mentioned above when, during the period in which the motor 40 is energized so as to alter the position of the seat, the seat occupant exerts force on the seat in the direction in which it is being driven by means of the seat driver mechanism in an attempt to force the seat to move more quickly that the rate at which it is being driven by the driver mechanism.

Under such circumstances the additional force exerted on the seat by the seat occupant is translated by the engagement between the threads of the threaded shaft member 35 and the seat driver nut 21 into a tangential force acting on the threaded member 35 in the direction of its rotation.

If left unchecked, this tangential force would cause the threaded member 35 to rotate faster than it is being driven to rotate by means of the engagement between the worm wheel 37 and the worm 36. This would cause the threaded shaft 35 to overrun the worm as set out above in connection with the prior art, and bring about the situation wherein the teeth of the worm wheel tend to disengage slightly from the driving face of the thread of the worm 36 and may even come into contact with a trailing face of a thread of the worm 36.

In the present invention however, the friction developed between the threaded shaft 35 and the resilient governor members 50 prevents the threaded shaft member 35 from being accelerated to the degree that could cause the same to overrun the worm gear mechanism, even under the above conditions wherein the seat occupant attempts to make the seat move faster than it is being driven by the power seat mechanism by manually applying additional force on the seat in the direction it is being moved.

Thus, backlash due to overrunning of the worm gear mechanism is avoided and the seat occupant experiences no unpleasant noise or vibrations due to backlash in the drive mechanism.

It will also be noted that, by carefully selecting the resilience of the elastic governor member, it is also possible to provide a governor mechanism wherein any additional force which is exerted on the seat in the direction of travel, causes the resilient member 50 to become compressed to the degree wherein it increases the pressure exerted by the walls of the through bore 53 on the threads of threaded member 35. This, of course, has the effect of increasing the governing friction in accordance with any additional force which is manually applied to the seat.

Figure 7:
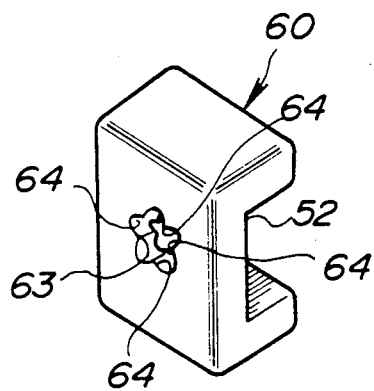
FIG. 7 is an enlarged perspective view of the resilient governor member of the second embodiment of the instant invention.

Referring now to FIG. 7, a second embodiment of a resilient governor member according to the invention is shown. It will be understood that the second embodiment of the governor member 60 (FIG. 7) is essentially similar in size, shape and function to the resilient governor member 50 of the first embodiment and is designed to be installed in the interior of the casing 21a along with the nut 25.

The second embodiment of the resilient member 60 however, differs from the resilient governor member in that the through bore 63, through which the threaded member 35 is passed, is formed so as to have a star-shaped cross-section. As a result of this construction, the inner periphery of the through bore 63 is provided with a plurality of inwardly facing protrusions 64 which engage the surface of the threaded member 35. The amount of friction produced between the inner surface of the through bore 63 and the outer surface of the threaded member 35 can be finely adjusted by selecting number, the length, the thickness, and the hardness of the inwardly protruding portions 64. In this manner the backlash in the worm gear mechanism can be suppressed without causing an unnecessarily high load on the motor.

Figure 8:
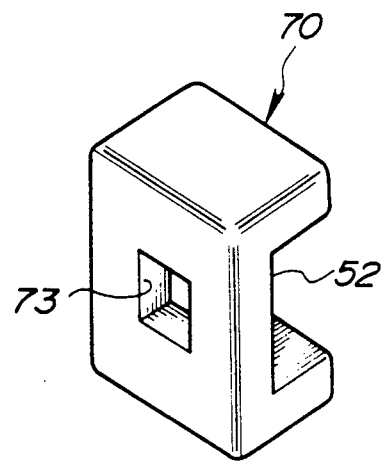
FIG. 8 is an enlarged perspective view of the resilient governor member of the third embodiment of the instant invention.

The third embodiment of the governor member 70 (shown in FIG. 8) is again essentially similar in size, shape and function to the resilient governor member 50 of the first embodiment and is designed to be installed in the interior of the casing 21a.

The resilient member 70 however differs from the resilient governor member 50 in that the through bore 73 through which the threaded member 35 is passed is formed so as to have a rectangular or square-shaped cross-section. Thus the inner periphery of the through bore 73 comprises four faces which engage the surface of the threaded member 35. The amount of friction produced by the engagement between the inner surface of the through bore 63 and the outer surface of the threaded member 35 can be finely adjusted by selecting the size of the hole 73, and the hardness of the material from which the governor member is formed.

Figure 9:
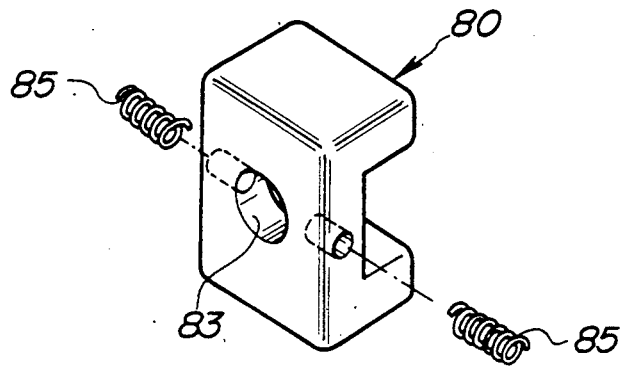
FIG. 9 is an enlarged perspective view of the resilient governor member of the fourth embodiment of the instant invention.

The fourth embodiment of the governor member 80 ( FIG. 9) is also essentially similar in size shape and function to the resilient governor members 50 of the first embodiment and is designed to be installed in the interior of the casing 21a along with the nut 25 in a manner identical to the resilient governor members 50.

The resilient governor member 80 however differs from the resilient governor member 50 in that compression springs 85 are provided at the periphery of the through bore 83. These compression springs 85 serve to urge the walls of the through bore 83, through which the threaded member 35 is passed, against the threaded shaft 35, and for increasing the force with which it engages the surface of the threaded member 35.

The amount of friction produced by the engagement between the inner surface of the through bore 83 and and the outer surface of the threaded member 35 can be finely adjusted or tuned by selecting the diameter of the through bore 83 and strength of the compression springs 85.

Figure 10:
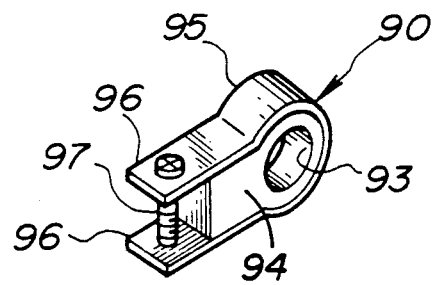
FIG. 10 is an enlarged perspective view of the resilient governor member of the fifth embodiment of the instant invention along with an adjuster clamp member by which it may be adjusted.

In FIG. 10, a fifth embodiment of a governor member 90 according to the invention is shown. The governor member according to the fifth embodiment comprises an internal resilient member 94 having a through bore 93, and a clamp band 95 which is bent into the form of a hose clamp. The clamp band 95 band is wrapped about the periphery of the resilient inner member 94 and comprises a pair of protruding tabs 96. The tabs 96 can be driven together by tightening an adjuster screw 97. Tightening the adjuster screw 97 thus causes the clamp band 95 to squeeze the resilient member 94 in the vicinity of the through bore 93 thus increasing the force which the walls of the through bore are caused to engage the periphery of the threaded member 35.

It will be appreciated from the above that a power seat driver unit formed in accordance with the instant invention backlash in the gear mechanism and the resulting unpleasant noises, vibrations and increased wear, are avoided by provision of a simple inexpensive device which produces a controlled amount of friction which inhibits rapid changes in the rotational speed of the threaded shaft which forms part of the seat drive train.

It will further be appreciated that, although in the above embodiments of the invention the elastic governor means have been disclosed as engaging the threaded portion of the threaded shaft member, embodiments of the invention are also possible wherein the elastic governor member engages an non-threaded portion of a threaded shaft member and or any suitable rotating element of the gear train, in order to produce the required amount of friction.

What is claimed is:

1. A vehicular power seat slide device comprising:
a guide rail rigidly mounted to a vehicle body;
a sliding rail, said sliding rail being slidably supported on said guide rail so as to be slidable thereon;
power means, said power means providing a power output for moving said sliding rail relative to said guide rail;
a drive shaft, said drive shaft being coupled to said power means so as to be driven to rotate thereby;
output gear means provided on an end of said drive shaft;
a threaded shaft member, said threaded shaft member being rotatably supported on one of said guide rail and said sliding rail so as to be axially immovable relative to the one of said guide rail and said sliding rail on which said threaded shaft member is supported;
driver nut means, said driver nut means being coupled to the one of said guide rail and said sliding rail on which said threaded shaft member is not mounted, so as to be substantially immovable relative thereto, said threaded shaft member being arranged so as to have a thread thereof in engagement with a thread of said driver nut means such that rotation of said threaded shaft member forces said threaded shaft member to move axially with respect to said driver nut means;
an input gear, said input gear being provided on one end of said threaded shaft member, said input gear being arranged so as to mesh with said output gear means so as to be driven to rotate thereby, the rotation of said input gear causing said threaded shaft member to be rotated; and
a governor member constructed of a resilient material and being generally U-shaped in construction, said governor member having a concavity into which a part of said driver nut means is tightly received in a manner to substantially suppress a relative movement therebetween, said governor member engaging a portion of said threaded shaft member for producing a frictional resistance which tends to resist the rotation of said threaded shaft member by a predetermined amount.

2. A vehicular power seat slide device as set forth in claim 1 wherein said governor member has a through bore, said through bore engaging said threaded member at a threaded portion thereof so as to produce said frictional resistance, and having a plurality of inwardly projecting protrusions formed on its inner periphery.

3. A vehicular power seat slide device as set forth in claim 1 wherein said governor member has a through bore, said through bore engaging said threaded shaft member at a threaded portion thereof so as to produce said frictional resistance, and having a square cross section.

4. A vehicular power seat slide device as set forth in claim 1 wherein said governor member has a cylindrical through bore through which said threaded shaft member is passed in a manner to be resiliently held by said governor member.

5. A vehicular power seat slide device as set forth in claim 1 wherein said governor member has a cylindrical through bore through which said threaded shaft member is passed in a manner to be resiliently held by said governor member and compression springs which are provided at a periphery of said through bore so as to increase a frictional force with which said governor member engages said threaded shaft member.

6. A vehicular power seat slide device as set forth in claim 1, further comprising another governor member, the two governor members sandwiching said driver nut means therebetween so as to tightly fit opposed ends of said driver nut means into respective concavities of said governor members.

7. A vehicular power seat slide device as set forth in claim 6 wherein said governor members are disposed in a casing by which said driver nut means is supported.

8. A vehicular power seat slide device as set forth in claim 7 wherein said governor members define a resilient connection, between said driver nut means and said casing.

9. A vehicular power seat slide device comprising:
a guide rail rigidly mounted to a vehicle body;
a sliding rail, said sliding rail being slidably supported on said guide rail so as to be slidable thereon;
power means, said power means providing a power output for moving said sliding rail relative to said guide rail;
a drive shaft, said drive shaft being coupled to said power means so as to be driven to rotate thereby;
output gear means provided on an end of said drive shaft;
a threaded shaft member, said threaded shaft member being rotatably supported on one of said guide rail and said sliding rail so as to be axially immovable relative to the one of said guide rail and said sliding rail on which said threaded shaft member is supported;

driver nut means, said driver nut means being coupled to he one of said guide rail and said sliding rail on which said threaded shaft member is not mounted, so as to be substantially immovable relative thereto, said threaded shaft member being arranged so as to have a thread thereof in engagement with a thread of said driver nut means such that rotation of said threaded shaft member forces said threaded shaft member to move axially with respect to said driver nut means;

an input gear, said input gear being provided on one end of said threaded shaft member, said input gear being arranged so as to mesh with said output gear means so as to be driven to rotate thereby, rotation of said input gear causing said threaded shaft member to be rotated; and a governor member comprising:

a resilient member having a through bore through which said threaded shaft member is passed in a manner to be resiliently held by said governor member; and an adjusting means for adjusting the size of said through bore so as to adjust a frictional resistance which tends to resist the rotation of said threaded shaft member.

10. A vehicular power seat slide device as set forth in claim 9 wherein said adjusting means comprises:

a clamp band disposed about the periphery of said resilient member, said clamp band being formed with a pair of tabs, said pair of tabs protruding from an edge of said resilient member and facing each other; and a screw threadedly engaging said pair of tabs so as to squeeze said resilient member by rotation of said screw in a given direction.

11. A vehicular power seat slide device comprising:

a guide rail rigidly mounted to a vehicle body;

a sliding rail, said sliding rail being slidably supported on said guide rail in a manner such that it is longitudinally slidable thereon;

a motor, said motor providing a power output for moving said sliding rail relative to said guide rail;

a drive shaft, said drive shaft being coupled to said motor so as to be driven to rotate thereby;

an worm gear provided on an end of said drive shaft;

a threaded shaft member, said threaded shaft member being rotatably supported on said sliding rail so as to be axially immovable relative thereto;

driver nut means, said driver nut means being coupled to said guide rail so as to be substantially immovable relative thereto, said threaded shaft member being arranged so as to have a thread thereof in engagement with a thread of said driver nut means such that rotation of said threaded shaft means forces said threaded shaft means to move axially with respect to said driver nut means;

a worm wheel, said worm wheel being provided on one end of said threaded shaft member, and being arranged so as to mesh with said worm gear so as to be driven to rotate thereby, rotation of said worm wheel causing said threaded member to rotate; and a resilient governor member, said governor member comprising a through bore engaging a portion of said threaded shaft member for producing a frictional resistance which resists the rotation of said threaded shaft member, said governor member having a concavity for receiving said driver nut means.

* * * * *